(12) United States Patent
Hayata et al.

(10) Patent No.: US 8,466,225 B2
(45) Date of Patent: Jun. 18, 2013

(54) AROMATIC POLYCARBONATE RESIN COMPOSITION AND MOLDED BODY THEREOF

(75) Inventors: Yusuke Hayata, Ichihara (JP); Akio Nodera, Ichihara (JP); Naosuke Mukawa, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 12/991,235

(22) PCT Filed: Mar. 26, 2009

(86) PCT No.: PCT/JP2009/056139
§ 371 (c)(1), (2), (4) Date: Nov. 5, 2010

(87) PCT Pub. No.: WO2009/136523
PCT Pub. Date: Nov. 12, 2009

(65) Prior Publication Data
US 2011/0065835 A1    Mar. 17, 2011

(30) Foreign Application Priority Data

May 7, 2008    (JP) .................................. 2008-121597

(51) Int. Cl.
C08K 3/04        (2006.01)
C08J 9/32        (2006.01)
C08F 290/04    (2006.01)

(52) U.S. Cl.
USPC ........... 524/496; 524/495; 524/504; 524/508; 523/218; 977/773; 977/788

(58) Field of Classification Search
USPC .. 524/504, 508, 537, 611, 495–496; 523/218; 977/773, 788, 902
See application file for complete search history.

(56) References Cited

U.S. PATENT DOCUMENTS

| | | | | |
|---|---|---|---|---|
| 5,986,037 | A * | 11/1999 | Miyamoto et al. | 528/198 |
| 7,217,757 | B2 * | 5/2007 | Nodera | 524/492 |
| 7,504,452 | B2 * | 3/2009 | Hayata et al. | 524/462 |
| 7,553,900 | B2 * | 6/2009 | Hayata et al. | 524/496 |
| 7,732,532 | B2 * | 6/2010 | Tsunori et al. | 525/240 |
| 7,994,239 | B2 * | 8/2011 | Mukawa et al. | 524/9 |
| 8,003,735 | B2 * | 8/2011 | Hayata et al. | 525/450 |
| 8,030,379 | B2 * | 10/2011 | Nodera et al. | 524/108 |
| 8,198,366 | B2 * | 6/2012 | Hayata et al. | 525/67 |
| 2003/0022989 | A1 * | 1/2003 | Braig et al. | 525/67 |
| 2003/0207984 | A1 * | 11/2003 | Ding et al. | 524/543 |
| 2004/0202602 | A1 * | 10/2004 | Masa-aki et al. | 423/445 R |
| 2005/0207962 | A1 | 9/2005 | Dietz et al. | |
| 2005/0209398 | A1 * | 9/2005 | Nodera | 524/588 |
| 2007/0197740 | A1 * | 8/2007 | Hayata et al. | 525/439 |
| 2007/0252508 | A1 * | 11/2007 | Kim et al. | 313/310 |
| 2010/0048779 | A1 * | 2/2010 | Hayata | 524/115 |
| 2011/0054107 | A1 * | 3/2011 | Hayata et al. | 524/504 |

FOREIGN PATENT DOCUMENTS

| | | |
|---|---|---|
| JP | 2006 291081 | 10/2006 |
| JP | 2006 306960 | 11/2006 |
| JP | 2007 529403 | 10/2007 |
| WO | 2009 008326 | 1/2009 |

OTHER PUBLICATIONS

International Search Report issued Apr. 28, 2009 in PCT/JP09/056139 filed Mar. 26, 2009.
U.S. Appl. No. 12/991,286, filed Nov. 5, 2010, Hayata.
U.S. Appl. No. 12/991,291, filed Nov. 5, 2010, Hayata.

* cited by examiner

Primary Examiner — Hannah Pak
(74) Attorney, Agent, or Firm — Oblon, Spivak, McClelland, Maier & Neustadt, L.L.P.

(57) ABSTRACT

An aromatic polycarbonate resin composition including 100 parts by mass of a polycarbonate resin (A) containing an aromatic polycarbonate resin (a-1) and/or a silicone-copolymerized polycarbonate (a-2), and 0.01 to 30 parts by mass of a nanoporous carbon (B). A molded body of the resin composition is also provided. The aromatic polycarbonate resin composition has improved flame retardancy, moisture resistance and stability at a high temperature molding stage because of the addition of the nanoporous carbon to the polycarbonate resin containing an aromatic polycarbonate and/or a silicone-copolymerized polycarbonate, and is suitably used as, for example, a casing for OA appliances, electric and electronic appliances or communication appliances.

9 Claims, No Drawings

AROMATIC POLYCARBONATE RESIN COMPOSITION AND MOLDED BODY THEREOF

This application is a 371 of PCT/JP2009/056139, filed Mar. 26, 2009.

TECHNICAL FIELD

The present invention relates to an aromatic polycarbonate resin composition and to a molded body thereof. More specifically, the present invention is directed to an aromatic polycarbonate resin composition that has excellent flame retardancy, moisture resistance and stability at a high temperature molding stage and to a molded body that is prepared using such a resin composition, in particular a casing for OA appliances, electric and electronic appliances or communication appliances.

BACKGROUND ART

Aromatic polycarbonate resins are widely utilized in various fields such as electric and electronic appliances, OA appliances, mechanical parts and automobile parts, because of their excellent mechanical properties such as shock resistance, and their excellent heat resistance and transparency. In the field of electric and electronic appliances and OA appliances, there is a demand for a material which has not only the above-mentioned excellent characteristics of aromatic polycarbonate resins but also high flame retardancy in order to satisfy safety requirements.

That is, while aromatic polycarbonate resins have a higher flame retardancy as compared with polystyrene-based resins, much higher flame retardancy is now required. Thus, various kinds of flame retardants are added to improve the flame retardancy. For example, organic halogen compounds and organic phosphorus compounds have been hitherto added. These flame retardants, however, have a problem in their toxicity. In particular, organic halogen compounds have a problem because a corrosive gas is generated upon combustion. In this circumstance, there is an increasing demand for achieving flame retardancy using non-bromine and non-phosphorus flame retardants.

As a method for imparting flame retardancy to a polycarbonate resin using the above-described non-bromine and non-phosphorus flame retardant, there is proposed a method in which a silicone compound or a metal salt is added (see, for example, Patent Document 1). The addition of such a flame retardant, however, causes a possibility that the mechanical properties such as impact strength are deteriorated and the flame retardancy and shock resistance are reduced because secondary aggregation of the flame retardant is apt to occur.

Especially in the field of electric and electronic appliances and OA appliances, there is a demand for high flame retardancy and for an improvement of moisture resistance and stability at a high temperature molding stage.

PRIOR ART DOCUMENT

[Patent Document 1] Japanese Unexamined Patent Application Publication No. 2005-263909

DISCLOSURE OF THE INVENTION

Problem to be Solved by the Invention

The present invention has been made in view of the above-described circumstance and is aimed at the provision of an aromatic polycarbonate resin composition that has high flame retardancy and improved moisture resistance and stability at a high temperature molding stage, and of a molded body thereof.

Means for Solving the Problem

The present inventors have made an earnest study with a view toward accomplishing the above object. As a result, they have found that a resin composition having improved flame retardancy, moisture resistance and stability at a high temperature molding stage can be obtained by adding a specific proportion of a nanoporous carbon to a polycarbonate resin which comprises an aromatic polycarbonate and/or a silicone-copolymerized polycarbonate, and have arrived at the present invention.

That is, the present invention provides the following aromatic polycarbonate resin composition and molded body thereof:

1. An aromatic polycarbonate resin composition comprising 100 parts by mass of a polycarbonate resin (A) which comprises an aromatic polycarbonate resin (a-1) and/or a silicone-copolymerized polycarbonate (a-2), and 0.01 to 30 parts by mass of a nanoporous carbon (B);
2. The aromatic polycarbonate resin composition as recited in above 1, in which the nanoporous carbon (B) is in the form of hollow particles having an average particle diameter of 20 to 50 nm and each having pores with an average pore diameter of 5 nm or smaller in a surface thereof;
3. The aromatic polycarbonate resin composition as recited in above 1 or 2, in which the silicone of the silicone-copolymerized polycarbonate (a-2) is a polyorganosiloxane;
4. A molded body formed by using the aromatic polycarbonate resin composition as recited in any one of above 1 to 3; and
5. The molded body as recited in above 4, in which the molded body is a casing for OA appliances, electric and electronic appliances or communication appliances.

Effect of the Invention

According to the present invention, there is obtainable an aromatic polycarbonate resin composition having improved flame retardancy, moisture resistance and stability at a high temperature molding stage by adding a nanoporous carbon to a polycarbonate resin which contains an aromatic polycarbonate and/or a silicone-copolymerized polycarbonate. The resin composition is suitably used as, for example, a casing for OA appliances, electric and electronic appliances or communication appliances.

BEST MODE FOR CARRYING OUT THE INVENTION

The aromatic polycarbonate resin composition of the present invention includes a polycarbonate resin (A) which comprises an aromatic polycarbonate resin (a-1) and/or a silicone-copolymerized polycarbonate (a-2), and a nanoporous carbon (B).

The aromatic polycarbonate resin (a-1) of the polycarbonate resin (A) is not specifically limited and may be any of various aromatic polycarbonate resins. Generally used is an aromatic polycarbonate resin obtained by the reaction of a dihydric phenol with a carbonate precursor.

As the dihydric phenol, there may be mentioned a compound represented by the general formula (1) shown below. In the formula (1), $R^1$ and $R^2$ may be the same or different and each represent a $C_1$ to $C_6$ alkyl group or a phenyl group, Z represents a single bond, a $C_1$ to $C_{20}$ alkylene group, a $C_2$ to $C_{20}$ alkylidene group, a $C_5$ to $C_{20}$ cycloalkylene group, a $C_5$ to $C_{20}$ cycloalkylidene group, or a bond of the formula —$SO_2$—, —SO—, —S—, —O— or —CO—, preferably an isopropylidene group. The symbols b and c each represent an integer of 0 to 4, preferably 0.

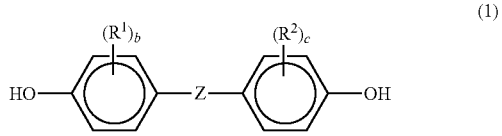

(1)

Various dihydric phenols may be used. Among them, there may be specifically mentioned 2,2-bis(4-hydroxyphenyl)propane [bisphenol A], bis(4-hydroxyphenyl)methane, 1,1-bis (4-hydroxyphenyl)ethane, 2,2-bis(4-hydroxy-3,5-dimethylphenyl)propane, bis(4-hydroxyphenyl)cycloalkanes, bis (4-hydroxyphenyl)oxide, bis(4-hydroxyphenyl)sulfide, bis (4-hydroxyphenyl)sulfone, bis(4-hydroxyphenyl) sulfoxide and bis(4-hydroxyphenyl) ketone. Preferred dihydric phenols are bis(4-hydroxyphenyl)alkanes and particularly preferred are those obtained from bisphenol A.

Examples of the carbonate precursor include carbonyl halides, carbonic acid ester compounds and haloformates. Specific examples include phosgene, dihaloformates of dihydric phenols, diphenyl carbonate, dimethyl carbonate and diethyl carbonate. In addition, hydroquinone, resorcinol and catechol may be mentioned as the dihydric phenol. The above-described dihydric phenols may be used singly or as a mixture of two or more thereof.

The aromatic polycarbonate resin (a-1) may be produced from a dihydric phenol, a carbonate precursor and, if necessary, a chain terminator, such as a monohydric phenol, and a branching agent. That is, the aromatic polycarbonate resin may be produced by a solution method (an interfacial method) or by a melting method, namely, by reaction of a dihydric phenol with phosgene or by transesterification between a dihydric phenol and, for example, diphenyl carbonate. The monohydric phenol used as a chain terminator is represented by the following general formula (2). In the formula (2), $R_3$ represents a $C_1$ to $C_{35}$ alky group, and the symbol (a) is an integer of 0 to 5.

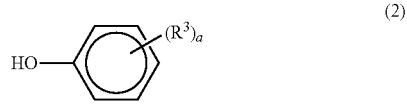

(2)

The monohydric phenol is preferably a para-substituted phenol. Specific examples of the monohydric phenol include phenol, p-cresol, p-tert-butylphenol, p-tert-pentylphenol, p-tert-octylphenol, p-cumylphenol, p-nonylphenol, docosylphenol, tetracosylphenol, hexacosylphenol, octacosylphenol, triacontylphenol, dotriacontylphenol, tetratriacontylphenol and p-tert-pentylphenol. These compounds may be used singly or as a mixture of two or more thereof. If necessary, these phenol compounds may be used together with other phenol compounds.

As the branching agent, there may be mentioned a compound having three or more functional groups (polyfunctional aromatic compound), such as 1,1,1-tris(4-hydroxyphenyl)ethane, α,α',α"-tris(4-hydroxyphenyl)-1,3,5-triisopropylbenzene, 1-[α-ethyl-α-(4'-hydroxyphenyl) ethyl]-4-[α',α'-bis(4"-hydroxyphenyl)ethyl]benzene, fluoroglycin, trimellitic acid, or isatinbis(o-cresol).

The aromatic polycarbonate resin (a-1) preferably has a viscosity average molecular weight of 9,000 to 40,000, more preferably 15,000 to 30,000, from the standpoint of physical properties of the resin composition.

The viscosity average molecular weight (Mv) herein is calculated from the formula: $[\eta]=1.23\times10^{-5} Mv^{0.83}$ where [η] is an intrinsic viscosity obtained by measuring the viscosity of a methylene chloride solution at 20° C. using a Ubbelohde viscometer.

The silicone-copolymerized polycarbonate (a-2) of the polycarbonate resin (A) has a terminal group represented by the general formula (3) and may be, for example, copolymers disclosed in JP-A-S50-29695, JP-A-H03-292359, JP-A-H04-202465, JP-A-H08-81620, JP-A-H08-302178 and JP-A-H10-7897.

In the formula (3), $R^4$ represents a $C_1$ to $C_{33}$ alkyl group and the symbol d is an integer of 0 to 5. The group $R^4$ may be straight-chained or branched and may be bonded at any of the p-, m- or o-position, preferably at the p-position.

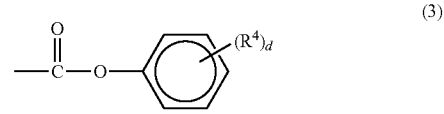

(3)

The silicone-copolymerized polycarbonate (a-2) is preferably a copolymer having, within its molecule, a polycarbonate moiety containing a structural unit represented by the general formula (4) and a polyorganosiloxane moiety (segment) containing a structural unit represented by the general formula (5).

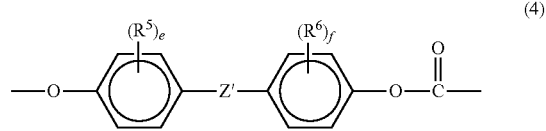

(4)

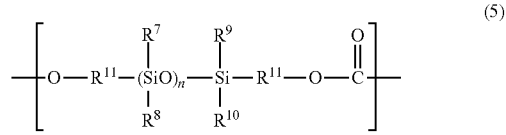

(5)

In the above formulas (4) and (5), $R^5$ and $R^6$ may be the same or different and each represent a $C_1$ to $C_6$ alkyl group or a phenyl group, $R^7$ to $R^{10}$ each represent a $C_1$ to $C_6$ alkyl group or a phenyl group, preferably a methyl group. $R^7$ to $R^{10}$ may be the same or different. $R^{11}$ represents a divalent organic group containing an aliphatic or aromatic group and is preferably a divalent group represented by the formula shown below.

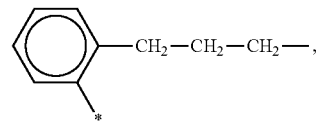

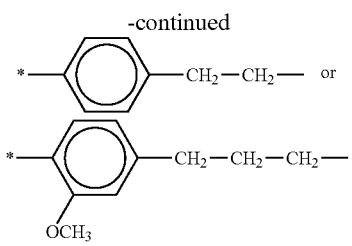

(wherein the mark * is a bond connected to the oxygen atom.)

In the above formula (4), the symbol Z' represents a single bond, a $C_1$ to $C_{20}$ alkylene group, a $C_2$ to $C_{20}$ alkylidene group, a $C_5$ to $C_{20}$ cycloalkylene group, a $C_5$ to $C_{20}$ cycloalkylidene group or a bond of the formula $-SO_2-$, $-SO-$, $-S-$, $-O-$ or $-CO-$, preferably an isopropylidene group. The symbols e and f each represent an integer of 0 to 4, preferably 0, and n is an integer of 1 to 500, preferably 5 to 300, more preferably 15 to 200, still more preferably 30 to 150.

The silicone-copolymerized polycarbonate may be produced by, for example, dissolving a previously prepared polycarbonate oligomer (hereinafter referred to as PC oligomer), which constitutes the polycarbonate moiety, and a polyorganosiloxane (reactive PORS), which has a reactive group of the formula $-R''-OH$ (where R'' is as defined previously) at a terminal thereof and which constitutes the polyorganosiloxane moiety (segment), in a solvent such as methylene chloride, chlorobenzene or chloroform, the resulting solution being, after having been added with an aqueous alkali hydroxide solution of a dihydric phenol, subjected to an interfacial polycondensation reaction using a tertiary amine (such as triethylamine) or a quaternary ammonium salt (such as trimethylbenzylammonium chloride) as a catalyst in the presence of an general terminating agent such as a phenol compound represented by the general formula (6) shown below.

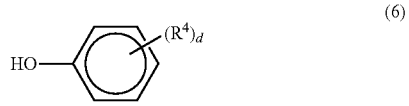

(6)

(wherein $R^4$ and d are as defined previously.)

As the phenol compound of the formula (6), there may be mentioned the compounds exemplified above in connection with the general formula (2). The polyorganosiloxane moiety (segment) is preferably contained in an amount of 0.2 to 10% by mass based on the silicone-copolymerized polycarbonate and is preferably contained in an amount of 0.1 to 5% by mass based on the polycarbonate resin (A) of the present invention.

The PC oligomer used for the production of the silicone-copolymerized polycarbonate may be prepared by reaction of a dihydric phenol with a carbonate precursor such as phosgene in a solvent such as methylene chloride or by transesterification of a dihydric phenol with a carbonate precursor such as diphenyl carbonate.

As the dihydric phenol, there may be used the compounds exemplified above in connection with the general formula (1). Among them, 2,2-bis(4-hydroxyphenyl)propane [bisphenol A] is preferred.

As the afore-mentioned carbonic acid ester, there may be mentioned diaryl carbonates such as diphenyl carbonate, and dialkyl carbonate such as dimethyl carbonate and diethyl carbonate.

The PC oligomer used for the production of the silicone-copolymerized polycarbonate may be a homopolymer obtained using a single one of the above dihydric phenols or a copolymer obtained using two or more thereof. Further, the PC oligomer may be a thermoplastic randomly branched polycarbonate obtained by using a polyfunctional aromatic compound together with the dihydric phenol.

In this case, the afore-mentioned polyfunctional aromatic compounds may be used as the branching agent.

The silicone-copolymerized polycarbonate may be produced in the manner as described above. In this case, since an aromatic polycarbonate is generally by-produced, the product can be the polycarbonate resin (A) containing a polycarbonate-polyorganosiloxane copolymer.

The silicone-copolymerized polycarbonate produced by the above method substantially has an aromatic terminal group represented by the general formula (3) at one end or each of both ends of the molecule thereof.

In the present invention, it is preferred that the silicone of the silicone-copolymerized polycarbonate (a-2) be a polyorganosiloxane for reasons of improved heat resistance, flame retardancy and impact resistance. Especially preferred is the silicone-copolymerized polycarbonate in which the silicone is a polydimethylsiloxane and which is a polycarbonate-polydimethylsiloxane copolymer having a chain length (n) of the polydimethylsiloxane of 30 to 120.

In the present invention, the polycarbonate resin (A) may be the polycarbonate resin (a-1) alone, the silicone-copolymerized polycarbonate (a-2) alone, or a mixture of the components (a-1) and (a-2). When the components (a-1) and (a-2) are used in the form of a mixture, the mass ratio (a-1) to (a-2) is preferably 90:10 to 40:60, more preferably 80:20 to 50:50.

The nanoporous carbon (B) of the aromatic polycarbonate resin composition of the present invention is a new type of nanomaterial found after the conventional carbon nanotubes, nanodiamonds, ceramic nanofibers, and nanocerametals. A method for producing the nanoporous carbon is disclosed in, for example, Japanese published translation of PCT application No. 2007-529403.

The nanoporous carbon is particles of carbon having pores in the surfaces of the particles. Because of their extended surface area and microporous structure, the nanoporous carbon is used as filters, membranes, sorbents, catalyst supports and electrode materials. Pores having dimensions (diameter or width) of less than 2 nm are defined as micropores, those between 2 and 50 nm are considered to be mesopores, and those greater than 50 nm are macropores.

In the present invention, a nanoporous carbon, which is in the form of porous particles having an average particle diameter of 20 to 50 nm and which has pores with an average pore diameter of 5 nm or less in surfaces of the particles, is suitably used.

The aromatic polycarbonate resin composition of the present invention contains the nanoporous carbon (B) in an amount of 0.01 to 30 parts by mass, preferably 0.05 to 10 parts by mass, more preferably 0.5 to 3 parts by mass, per 100 parts by mass of the polycarbonate resin (A).

When the content of the nanoporous carbon (B) is 0.01 part by mass or more, the effect of improving the moisture resistance and flame retardancy may be obtained. When the content of the nanoporous carbon (B) is 30 part by mass or less, it is possible to suppress a reduction of the moisture resistance and flame retardancy.

The aromatic polycarbonate resin composition of the present invention may contain a thermoplastic resin (C) other than the polycarbonate resin (A), an inorganic filler (D) and a fluororesin (E) for the purpose of further improving the moldability and flame retardancy.

As the thermoplastic resin (C), there may be mentioned, for example, a polyolefin-based resin, a styrenic resin and a polyester-based resin. The thermoplastic resin may be generally used in an amount of 0 to 100 parts by mass, preferably 5 to 50 parts by mass, per 100 parts by mass of the polycarbonate resin (A).

As the polyolefin-based resin of the component (C), there may be mentioned various polyolefin-based resins such as polyethylene-based resins, polypropylene-based resins and poly-1-butene-based resins.

Examples of the polyethylene-based resin include low density polyethylenes, linear low density polyethylenes, medium density polyethylenes, high density polyethylenes and copolymers of ethylene with other α-olefins. Examples of the polypropylene-based resin include crystalline propylene homopolymers, crystalline propylene-ethylene block or random copolymers, crystalline propylene-ethyleneα-olefin copolymers and mixtures of an elastomer with these crystalline propylene polymers.

These polyolefin-based resins may be used singly or as a mixture of two or more thereof. These polyolefin-based resins and mixtures thereof preferably has a melt flow rate (MFR) (at 230° C., 21.18 N) of 0.1 to 70 g/10 min, more preferably 0.1 to 50 g/10 min.

As the styrenic resin, there may be mentioned polymers that are prepared by polymerization of a monomer or a monomer mixture of 20 to 100% by mass of a monovinylic aromatic monomer such as styrene or α-methylstyrene, 0 to 60% by mass of a vinyl cyanide type monomer such as acrylonitrile or methacrylonitrile, and 0 to 50% by mass of any other vinylic monomer copolymerizable with these monomers, such as maleimide or methyl (meth)acrylate. Examples of these polymers include polystyrenes (GPPS) and acrylonitrile-styrene copolymers (AS resins).

As the styrenic resin, a rubber-modified styrenic resin may also be preferably used. The rubber-modified styrenic resin is preferably a high-impact styrenic resin in which at least a styrenic monomer has been graft polymerized onto a rubber.

Examples of the rubber-modified styrenic resin include high-impact polystyrenes (HIPS) in which styrene has been polymerized onto a rubber such as polybutadiene, ABS resins in which acrylonitrile and styrene have been polymerized onto polybutadiene; MBS resins in which methyl methacrylate and styrene have been polymerized onto polybutadiene. These rubber-modified styrenic resins may be used in combination of two or more thereof, or may be used as a mixture with other styrenic resins that are not modified with a rubber such as those mentioned above.

Illustrative of suitable polystyrene-based resins are high-impact polystyrene resins (HIPS), acrylonitrile-styrene copolymers (AS resins), acrylonitrile-butadiene-styrene copolymers (ABS resins), methyl methacrylate-styrene copolymers (MS resins), methyl methacrylate-butadiene-styrene copolymers (MBS resins), acrylonitrile-methyl acrylate-styrene copolymers (AAS resins) and acrylonitrile-(ethylene/propylene/diene copolymer)-styrene copolymers (AES resins), with high-impact polystyrene resins (HIPS), acrylonitrile-styrene copolymers (AS resins) and acrylonitrile-butadiene-styrene copolymers (ABS resins) being particularly preferred.

As the polyester-based resin of the component (C), both aliphatic polyester and aromatic polyester may be used. As the aliphatic polyester, polylactic acid or a copolymer of lactic acid with a hyroxycarboxylic acid (these polymers will be occasionally collectively referred to as "lactic acid-based resin") are preferably used from the standpoint of reduction of an environmental load.

Polylactic acid is generally synthesized by ring-opening polymerization of a cyclic dimer of lactic acid called lactide, and a manufacturing method thereof is disclosed in, for example, U.S. Pat. No. 1,995,970, U.S. Pat. No. 2,362,511 and U.S. Pat. No. 2,683,136.

A copolymer of lactic acid with another hydroxycarboxylic acid may be generally synthesized by ring-opening polymerization of a lactide and a cyclic ester intermediate of the hydroxycarboxylic acid, and a manufacturing method thereof is disclosed in, for example, U.S. Pat. No. 3,635,956 and U.S. Pat. No. 3,797,499.

When the lactic acid-based resin is manufactured by direct dehydrative polycondensation rather than ring-opening polymerization, a lactic acid homolog and, if necessary, other hydroxycarboxylic acid are subjected to azeotropic dehydration condensation preferably in the presence of an organic solvent, particularly a phenyl ether type solvent. During the polymerization, it is particularly preferred that the water-containing solvent azeotropically distilled out be treated for the removal of water and the resulting substantially anhydrous solvent be recycled to the reaction system, because a lactic acid-based resin which has an appropriate degree of polymerization and is suitable for the present invention can be obtained.

As the lactic acid homolog used as a raw material, there may be used L- and D-lactic acid, a mixture thereof and a lactide that is a dimer of lactic acid.

As the other hydroxycarboxylic acids, which can be used in conjunction with the lactic acid homolog, there may be mentioned, for example, glycolic acid, 3-hydroxybutyric acid, 4-hyroxybutyric acid, 4-hydroxyvaleric acid, 5-hydroxyvaleric acid, 6-hydroxycaproic acid and, further, cyclic ester intermediates of a hydroxycarboxylic acids, such as glycolide that is a dimer of glycolic acid and ε-caprolactone that is a cyclic ester of 6-hydroxycaproic acid.

The polylactic acids and copolymers of lactic acid homologs with hydroxycarboxylic acids preferably have a large molecular weight from the standpoint of thermal properties and mechanical properties thereof and, in particular, have a weight average molecular weight of preferably at least 30,000. From the standpoint of durability, rigidity and biodegradability, polylactic acids are preferred among the aforementioned lactic acid-based resins.

As the inorganic filler (D), there may be mentioned, for example, talc, mica, wollastonite, kaolin, diatomaceous earth, calcium carbonate, calcium sulfate, barium sulfate, glass fibers, carbon fibers and potassium titanate. Above all, talc, mica and wollastonite are preferred. These inorganic fillers are preferably in the form of plate-like ones.

Talc is a water-containing magnesium silicate. Talc that is available on the marketplace may be used. Talc for use herein may have an average particle diameter of from 0.1 to 50 μm, particularly preferably 0.2 to 20 μm.

The inorganic filler (D) is contained in the composition in an amount of 0 to 30 parts by mass, preferably 5 to 20 parts by mass, per 100 parts by mass of the polycarbonate resin (A).

The fluororesin (E) is added for the purpose of improving the flame retardancy. The fluororesin (E) is generally a polymer or copolymer containing a fluoro-ethylenic structure. Examples of the fluororesin include difluoroethylene polymers, tetrafluoroethylene polymers, tetrafluoroethylene-hexafluoropropylene copolymers, and copolymers of tetrafluoroethylene with fluorine-free ethylenic monomers. Preferred is polytetrafluoroethylene (PTFE) desirably having an average molecular weight of at least 500,000, particularly desirably from 500,000 to 10,000,000. Any and every type of polytetrafluoroethylene known at present in the art is usable for the purpose of the present invention.

Among polytetrafluoroethylenes, the use of those which are capable of forming fibrils can impart especially high melt-dropping preventing ability. The fibril-forming polytetrafluoroethylene is not specifically limited, but is preferably, for example, one which is classified into Type 3 stipulated in the ASTM Standard. Specific examples of the Type 3 polytetrafluoroethylene include TEFLON 6-J (registered trademark; manufactured by DUPONT-MITSUI FLUOROCHEMICALS COMPANY, LTD.), POLYFLON D-1, POLYFLON F-103, POLYFLON F201 (all manufactured by DAIKIN INDUSTRIES, LTD), and CD076 (manufactured by ASAHI ICI FLUOROPOLYMERS CO., LTD.).

Other polytetrafluoroethylenes than those of Type 3 may be, for example, ARGOFLON F5 (manufactured by MONTEFLUOS SpA), POLYFLON MPA and POLYFLON FA-100 (both manufactured by DAIKIN INDUSTRIES, LTD). These polytetrafluoroethylenes (PTFE) may be used singly or in combination of two or more thereof. The fibril-forming polytetrafluoroethylenes may be obtained by, for example, polymerizing tetrafluoroethylene in an aqueous solvent in the presence of sodium, potassium or ammonium peroxydisulfide, under a pressure of 7 to 690 kPA (1 to 100 psi) at a temperature of 0 to 200° C., preferably 20 to 100° C.

The fibril-forming polytetrafluoroethylenes may be obtained by, for example, polymerizing tetrafluoroethylene in an aqueous solvent in the presence of sodium, potassium or ammonium peroxydisulfide, under a pressure of 7 to 690 kPA (1 to 100 psi) at a temperature of 0 to 200° C., preferably 20 to 100° C.

The content of the fluororesin in the composition is generally 0 to 2 parts by weight, preferably between 0.1 to 0.5 part by weight, per 100 parts by mass of the resin polycarbonate resin (A). The amount of the fluororesin may be suitably determined depending on the required flame retardancy of the moldings of the composition, for example, based on V-0, V-1 or V-2 in UL-94 in consideration with the amount of the other components.

The aromatic polycarbonate resin composition of the present invention may contain the following additive or additives, if desired.

Namely, as the additives, there may be mentioned, for example, a phenolic, phosphorus-containing or sulfur-containing antioxidant, an antistatic agent, a polyamide-polyether block copolymer (for imparting permanent antistatic properties), a benzotriazole-type or benzophenone-type UV absorbent, a hindered amine-type light stabilizer (weatherproofing agent), a plasticizer, a microbicide, a compatibilizer, and a colorant (dye or pigment).

The compounding amount of the additives is not specifically limited as long as the characteristics of the aromatic polycarbonate resin composition of the invention are maintained. The compounding amount is properly determined in consideration of the molecular weights of the polycarbonate resin and other resins, the kind and melt flow rate of the polyolefin-based resin, and the intended use, size, thickness, etc. of the molding thereof.

Next, a method for producing the aromatic polycarbonate resin composition of the present invention will be described. The aromatic polycarbonate resin composition of the present invention may be produced by mixing, in predetermined proportions, the components (A) and (B) and, optionally, the components (C) to (E) and additives that are used as necessary, and kneading the resulting mixture.

The mixing and kneading procedures may be carried out in any known manner, for example, by pre-mixing them in a customarily employed device, such as a ribbon blender or a drum tumbler, followed by further kneading the resulting pre-mix in a Banbury mixer, a single-axis screw extruder, a double-axis screw extruder, a multi-axis screw extruder or a co-kneader. The temperature at which the components are mixed and kneaded is generally in the range of 240 to 280° C. For molding the melt mixture, preferably used is an extrusion molding machine, more preferably a vented extruder. Other components than polycarbonate resin may be added after being formed into a master batch.

The aromatic polycarbonate resin composition of the present invention may be directly molded into a molded article using the above-described melt-molding device. Alternatively, the composition is first pelletized, and the resulting pellets may be molded into a highly transparent molded article by any known molding method such as hollow molding, injection molding, extrusion molding, vacuum forming, air pressure molding, hot bending, compression molding, calendar molding or rotational molding.

Especially preferably, the composition is pelletized by the above-described melt-kneading method, and the resulting pellets are molded into molded articles by injection molding or injection compression molding. As the injection molding, a gas injection molding method may be adopted so as to prevent shrinkage cavity of the moldings and to reduce the weight of the moldings.

Molded articles obtainable from the aromatic polycarbonate resin composition of the present invention may be used as housings for OA appliances, electric and electronic appliances and communication appliances, such as duplicators, facsimiles, televisions, radios, tape recorders, video decks, personal computers, printers, telephones, information terminals, refrigerators and microwave ovens. The moldings may be further used as parts of these appliances and, further, in other fields such as in an automobile part field.

EXAMPLES

The present invention will next described more concretely by way of Examples. The scope of the present invention is, however, not restricted to the examples in any way.

The evaluation of performance was carried out by the following measurement methods.

(1) Flame Retardancy

Test samples with thicknesses of 0.8 mm and 1.0 mm prepared in accordance with the UL standard were subjected to Horizontal Burning Test and Vertical Burning Test. The test results were evaluated UL94 flammability ratings (Horizontal Burning Test: HB, Vertical Burning Test: V-0, V-1 and V2 in decreasing order of flame resistance). Test samples which did not belong to the above ratings were determined to be "outside" (outside the specification range).

(2) Moisture Resistance

A dumbbell test sample with a thickness of 32 mm (⅛ in) was stretched with an inter-chuck distance of 115 mm and a stretching speed of 50 mm/min to measure its tensile elongation ($L_1$), A similar dumbbell test sample was exposed to conditions including a temperature of 65° C. and relative humidity of 85% for 2,000 hours and, thereafter, measured for its tensile elongation ($L_2$) in the same tensile test as above. A physical property retention ability (%) was determined from the ratio of $L_2/L_1$.

(3) Thermal Stability

A test composition was retained in the molding device at 300° C. for 20 minutes and then molded into a rectangular plate with a size of 80×40×3 mm. The molded sample was observed with naked eyes for evaluating the thermal stability according to the following ratings.
A: No changes in appearance are observed.
B: Slight flow marks are observed.
C: Appearance defects such as silver marks are observed but no peel or cracks are observed.
D: Shape changes such as cracks and peels are observed.
(4) IZOD Impact Strength A test piece with a thickness of 3.2 mm (⅛ inch) was prepared by an injection molding device and measured for the impact strength in accordance with ASTM Standard D-256.

Examples 1 to 7 and Comparative Examples 1 and 12

Respective starting materials shown below were each dried. Components (A) to (E) were uniformly blended with a tumbler at blending proportions shown in Tables 1 to 3. Thereafter, each of the blends was supplied to a vented two-axis extruder having a diameter of 35 mm (Model TEM 35 manufactured by TOSHIBA MACHINE CO., LTD.), and was kneaded and pelletized at a temperature of 260° C.

The thus obtained pellets were dried at 120° C. for 5 hours and injection molded with an injection molding machine at a cylinder temperature of 240° C. and a die temperature of 80° C., whereby respective test pieces were obtained. The test pieces were subjected to various tests. The results of evaluation are summarized in Tables 1 to 3.

(A)-1: Bisphenol A polycarbonate having a viscosity average molecular weight of 19,000 (A1900 manufactured by Idemitsu Kosan Co., Ltd.)
(A)-2: Silicone-copolymerized polycarbonate having a viscosity average molecular weight of 17,000, a PDMS (polydimethylsiloxane) content of 4.0% by mass (prepared in accordance with Preparation Example 4 described in JP-A-2002-12775)
(B)-1: Nanoporous carbon (manufactured by EASY Nanotechnology, average particle diameter: 35 nm, average pore diameter: 2 nm)
(B)-2; Carbon black (for comparison purpose) (#960 manufactured by Mitsubishi Chemical Corporation, average particle diameter: 16 nm, pore: none)
(C)-1: Polylactic acid (3001D manufactured by Nature Works LLC)
(C)-2: ABS resin (AT-95 manufactured by NIPPON A&L INC.)
(C)-3: Homopolypropylene (J-700M manufactured by Prime Polymer Co., Ltd.)
(D): Talc (TP-A25 manufactured by FUJI TALC INDUSTRIAL CO., LTD.)
(E): Polytetrafluoroethylene (PTFE CD076 manufactured by ASAHI GLASS CO., LTD.)

TABLE 1

| | | | | Example | | | | | | |
|---|---|---|---|---|---|---|---|---|---|---|
| | | | | 1 | 2 | 3 | 4 | 5 | 6 | 7 |
| Compounding Amount | (A) | (A)-1 | | 100 | | 70 | 70 | 70 | 70 | 70 |
| | | (A)-2 | | | 100 | 30 | 30 | 30 | 30 | 30 |
| | (B) | (B)-1 | | 20 | 20 | 2 | 1 | 5 | 5 | 5 |
| | | (B)-2/ Comparative | | | | | | | | |
| | (C) | (C)-1 | | | | | | 30 | | |
| | | (C)-2 | | | | | | | 20 | |
| | | (C)-3 | | | | | | | | 10 |
| | (D): Talc | | | | | | | 12 | 10 | 10 |
| | (E): PTFE | | | | | | 0.4 | 0.4 | 0.4 | 0.4 |
| Evaluation | (1) Flame Retardancy | 0.8 mm thick | | V-2 | V-1 | V-1 | V-0 | — | — | — |
| | | 1.0 mm thick | | V-2 | V-1 | V-1 | V-0 | V-1 | V-1 | V-1 |
| | (2) Moisture Resistance | Before exposure | | 100 | 100 | 110 | 105 | 50 | 80 | 50 |
| | | After exposure | | 95 | 90 | 100 | 100 | 45 | 72 | 50 |
| | | Physical property retention ability | | 95 | 90 | 91 | 95 | 90 | 90 | 100 |
| | (3) Thermal stability | | | A | A | A | A | B | A | A |
| | (4) IZOD Impact strength [kJ/m$^2$] | | | 75 | 80 | 70 | 70 | 20 | 50 | 20 |

TABLE 2

| | | | | Comparative Example | | | | | | |
|---|---|---|---|---|---|---|---|---|---|---|
| | | | | 1 | 2 | 3 | 4 | 5 | 6 | 7 |
| Compounding Amount | (A) | (A)-1 | | 100 | 70 | 100 | 100 | | 100 | |
| | | (A)-2 | | | 30 | | | 100 | | 100 |
| | (B) | (B)-1 | | | | 0.005 | 50 | 0.005 | | |
| | | (B)-2/ Comparative | | | | | | | 20 | 20 |

TABLE 2-continued

|  |  |  | Comparative Example | | | | | | |
|---|---|---|---|---|---|---|---|---|---|
|  |  |  | 1 | 2 | 3 | 4 | 5 | 6 | 7 |
|  | (C) | (C)-1 |  |  |  |  |  |  |  |
|  |  | (C)-2 |  |  |  |  |  |  |  |
|  |  | (C)-3 |  |  |  |  |  |  |  |
|  | (D): Talc |  |  |  |  |  |  |  |  |
|  | (E): PTFE |  |  |  |  |  |  |  |  |
| Evaluation | (1) Flame Retardancy | 0.8 mm thick | V-2 | V-2 | V-2 | Out-side | V-2 | Out-side | Out-side |
|  |  | 1.0 mm thick | V-2 | V-2 | V-2 | Out-side | V-2 | Out-side | Out-side |
|  | (2) Moisture Resistance | Before exposure | 100 | 110 | 100 | 10 | 100 | 50 | 55 |
|  |  | After exposure | 50 | 45 | 50 | 2 | 60 | 15 | 18 |
|  |  | Physical property retention ability | 50 | 41 | 50 | 20 | 60 | 30 | 33 |
|  | (3) Thermal stability |  | C | C | C | D | C | D | D |
|  | (4) IZOD Impact strength [kJ/m$^2$] |  | 75 | 78 | 75 | 20 | 80 | 20 | 25 |

TABLE 3

|  |  |  | Comparative Example | | | | |
|---|---|---|---|---|---|---|---|
|  |  |  | 8 | 9 | 10 | 11 | 12 |
| Compounding Amount | (A) | (A)-1 | 70 | 70 | 70 | 70 | 70 |
|  |  | (A)-2 | 30 | 30 | 30 | 30 | 30 |
|  | (B) | (B)-1 |  |  |  |  |  |
|  |  | (B)-2/ Comparative | 2 | 1 |  |  |  |
|  | (C) | (C)-1 |  |  | 30 |  |  |
|  |  | (C)-2 |  |  |  | 20 |  |
|  |  | (C)-3 |  |  |  |  | 10 |
|  | (D): Talc |  |  |  | 12 | 10 | 10 |
|  | (E): PTFE |  |  | 0.4 | 0.4 | 0.4 | 0.4 |
| Evaluation | (1) Flame Retardancy | 0.8 mm thick | Out-side | V-2 | — | — | — |
|  |  | 1.0 mm thick | Out-side | V-1 | Out-side | Out-side | Out-side |
|  | (2) Moisture Resistance | Before exposure | 100 | 110 | 50 | 80 | 50 |
|  |  | After exposure | 45 | 50 | 15 | 50 | 30 |
|  |  | Physical property retention ability | 45 | 45 | 30 | 63 | 60 |
|  | (3) Thermal stability |  | D | D | D | C | C |
|  | (4) IZOD Impact strength [kJ/m$^2$] |  | 60 | 60 | 15 | 50 | 15 |

From Tables 1-3 above, the following observations can be made:

(1) In Examples 1-7, polycarbonate resin compositions having excellent functions such as flame retardancy, moisture resistance, thermal stability and impact strength are obtained. Thus, it is possible to provide materials which have particularly improved flame retardancy and excellent moisture resistance, thermal stability and impact strength (Table 1).

(2) In Comparative Examples 1 and 2, because (B) component is not added, the flame retardancy, moisture resistance and thermal stability are not sufficient (Table 2).

(3) In Comparative Examples 3 to 5 and Comparative Examples 10 to 12, the compounding amount of (B) component does not fall within the scope of the claims, the flame retardancy, moisture resistance and thermal stability are not sufficient (Tables 2 and 3).

(4) Comparative Examples 6 to 9 indicate that, when carbon black is used as component (B), an improvement of the flame retardancy is not achieved and the moisture resistance and thermal stability are not sufficient (Tables 2 and 3).

The invention claimed is:

1. A molded casing of an OA appliance, an electric appliance, an electronic appliance, or a communication appliance formed with an aromatic polycarbonate resin composition, the polycarbonate resin composition comprising:
100 parts by mass of a polycarbonate resin (A) which comprises an aromatic polycarbonate resin (a-1) and a silicone-copolymerized polycarbonate (a-2), wherein a mass ratio of (a-1) to (a-2) is from 90:10 to 40:60; and 0.05 to 10 parts by mass of a nanoporous carbon (B), wherein the nanoporous carbon (B) is hollow particles of carbon having an average particle diameter of 20 to 50 nm, the hollow particles having pores with an average pore diameter of 5 nm or smaller on a surface thereof.

2. The molded casing as recited in claim 1, wherein the silicone of the silicone-copolymerized polycarbonate (a-2) is a polyorganosiloxane.

3. The molded casing as recited in claim 1, wherein said aromatic polycarbonate resin composition further comprises a fluororesin (E).

4. The molded casing as recited in claim 2, wherein said polyorganosiloxane is a polydimethylsiloxane.

5. The molded casing as recited in claim 2, wherein a content of the polyorganosiloxane is from 0.1 to 5.0% by mass based on the polycarbonate resin (A).

6. The molded casing as recited in claim 1, wherein said molded casing is a casing of an OA appliance.

7. The molded casing as recited in claim 1, wherein said molded casing is a casing of an electric appliance.

8. The molded casing as recited in claim 1, wherein said molded casing is a casing of an electronic appliance.

9. The molded casing as recited in claim 1, wherein said molded casing is a casing of a communication appliance.

* * * * *